United States Patent
Tarsha

[11] 3,863,677
[45] Feb. 4, 1975

[54] ACCUMULATOR WITH COMBINATION GUIDE AND SEAL RING

[75] Inventor: Manuel A. Tarsha, Santa Ana, Calif.

[73] Assignee: Parker-Hannifin Corporation, Cleveland, Ohio

[22] Filed: Apr. 23, 1973

[21] Appl. No.: 353,795

[52] U.S. Cl. .................................. 138/31
[51] Int. Cl. ............................. F16l 55/04
[58] Field of Search ........ 138/31; 308/305; 277/258

[56] References Cited
UNITED STATES PATENTS

| | | | |
|---|---|---|---|
| 2,780,504 | 2/1957 | Russell | 138/31 X |
| 2,804,094 | 8/1957 | Gratzmuller | 138/31 |
| 2,848,261 | 8/1958 | Schultze | 308/3.5 |
| 2,968,320 | 1/1961 | Gratzmuller | 138/31 |
| 3,198,213 | 8/1965 | Schindel | 138/31 |
| 3,330,605 | 7/1967 | Jasmand | 308/3.5 |
| 3,336,948 | 8/1967 | Lucien | 138/31 |
| 3,613,734 | 9/1969 | Elmer | 138/31 |

*Primary Examiner*—Richard C. Queisser
*Assistant Examiner*—Daniel M. Yasich
*Attorney, Agent, or Firm*—John N. Wolfram

[57] ABSTRACT

A piston type accumulator with a combination guide and seal ring mounted on the piston so that the ring slidably contacts the internal cylindrical wall of the accumulator to guide movement of the piston and so that it seals against one end of the accumulator when the piston is at such end to preclude leakage of fluid from one side of the piston to the other in case the regular seal for the piston is ineffective.

4 Claims, 3 Drawing Figures

ACCUMULATOR WITH COMBINATION GUIDE AND SEAL RING

BACKGROUND OF THE INVENTION

Gas charged piston type accumulators have a tendency to slowly lose the precharge pressure by leakage across the main piston seal when the hydraulic pressure is shut down for long periods of time. DUring operation, a main seal which is of resilient material is generally an effective seal particularly when it is lubricated during operation. However, during periods of inactivity, this seal may permit slow leakage of the gas to the hydraulic side.

Piston accumulators usually have guide rings on each end of the piston to preclude sticking or cocking of same and to prevent the piston from contacting the cylindrical inner wall of the accumulator. Teflon is widely used as the material for such guide rings for reducing friction.

SUMMARY OF THE INVENTION

The present invention relates to a piston type accumulator with a combination guide and sealing ring, preferably of Teflon, which guides the piston to prevent contact of the latter with the cylindrical inner wall of the accumulator and which also serves as a secondary seal for retaining the gas precharge pressure for longer periods of time when the hydraulic pressure is shut down. When the piston is approaching the hydraulic end of the accumulator shell because of a drop of hydraulic pressure, the combination ring will sealingly contact a valve face on the accumulator end cap before the piston itself contacts the end cap. Upon slight compression of the ring by the valve face the piston abuts a stop on the end cap to preclude further compression of the ring.

The combination guide and seal ring has grooves in the radially outer surface to provide adequate lubrication of the main piston seal during operation. A ring in accordance with the present invention is preferably installed on each end of the piston and, if desired, a valve face may be provided on the end cap on the gas side of the accumulator to provide a secondary seal to prevent loss of hydraulic fluid in the event of the loss of gas precharge.

DETAILED DESCRIPTION

Figure 1:
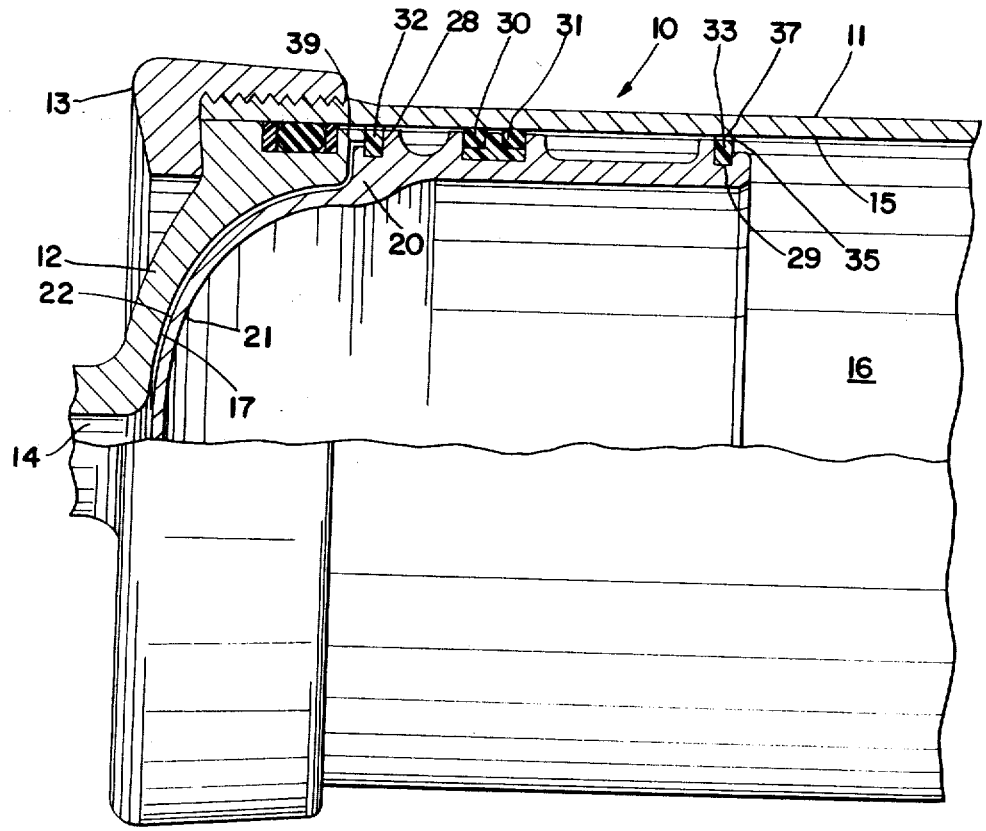
FIG. 1 is a partial longitudinal cross sectional view of one end of an accumulator employing the ring of the present invention showing the piston in abutment with one end cap.

FIG. 1 shows one end of a piston type accumulator 10 having a shell 11 with a cylindrical inner wall 15 and an end cap 12. The end cap is attached to the shell by a threaded retainer 13 and has a hydraulic passageway 14.

The other end of the accumulator is closed by another end cap, not shown. The accumulator has a piston 20 which is slidably movable therein to divide the accumlator into a gas chamber 16 and a hydraulic chamber 17 and has one side 21 which is acted upon by the gas precharge in chamber 16 and another side 22 which is acted upon by hydraulic fluid in chamber 17.

Figure 2:
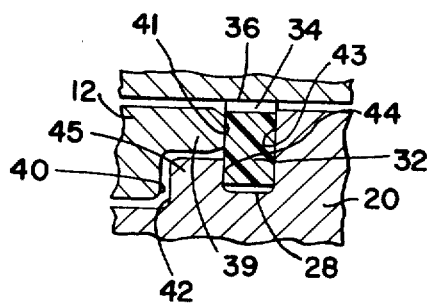
FIG. 2 is a reduced end view of the combination guide and sealing ring of FIG. 1.
Figure 3:
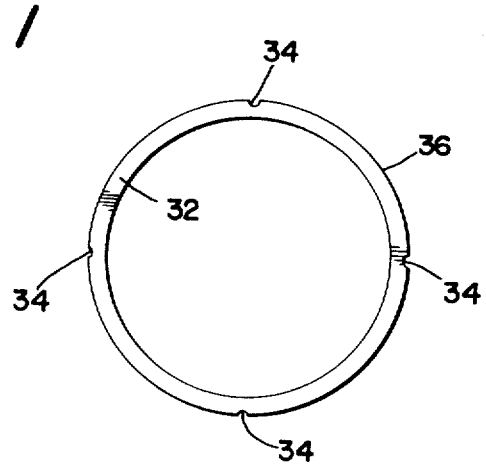
FIG. 3 is an enlarged view of a portion of the accumulator of FIG. 1 showing the ring.

Piston 20 has main seals 30 and 31 of resilient material mounted thereon and sealingly contacting shell 11. At each end, the piston has combination guide and sealing rings 32 and 33 mounted in grooves 28 and 29 respectively. As shown in FIG. 2, groove 28 has one side wall 43 that engages one side of ring 32 axially opposite valve face 41 and has another side wall 44 that engages the other side of ring 32 and which is formed on a flange 45 of piston 20. Flange 45 is of less diameter than annular projection 39 so that the latter can telescope over flange 45. Rings 32 and 33 have grooves 34 and 35 in the radially outer surfaces 36 and 37 respectively and projecting radially outwardly of adjacent portions of the piston to prevent contact of such piston portions with wall 15.

End cap 12 has stop surface 40 and has an annular valve face 41 on an axially projecting annular portion 39. The piston 20 has a shoulder 42 thereon.

OPERATION

When the gas pressure in chamber 17 is greater than hydraulic pressure in chamber 16, piston 20 moves toward end cap 12 until the two pressures are equalized. If the hydraulic pressure is reduced sufficiently the gas pressure in chamber 16 will move the piston toward end cap 12 until valve face 41 of end cap 12 engages combination ring 32, as shown in FIGS. 1 and 2. Ring 32 will then compress slightly in the axial direction until end cap shoulder 47 engages piston shoulder 42 to limit further compression. Such engagement and compression of ring 32 by valve face 41 establishes a secondary seal to prevent leakage of gas from chamber 16 to chamber around piston 20 in case piston seals 30, 31 are not effective.

Upon predetermined compression of ring 32 by valve face 41, the shoulder 42 of the piston abuts stop surface 40 of the end cap to prevent further or destructive deformation of ring 32. During normal operation, i.e. when the piston is not abutting the end cap, grooves 34 allow hydraulic fluid to pass through the combination 32 to lubricate seals 30 and 31.

If desired, the end cap (not shown) on the gas side of the accumulator may likewise be provided with a valve face and stop shoulder corresponding to 41 and 40 on end cap 12 to function in a corresponding manner in case gas pressure is lost from chamber 16 and the piston is moved by hydraulic pressure against the end cap on the gas side.

I claim:

1. An accumulator comprising a shell having a cylindrical inner wall, a piston axially movable in said shell and dividing the interior of the shell into two chambers, a combination guide and seal ring carried by the piston at each end thereof in slidable contact with said wall for guiding movement of said piston, each of said combination rings being adjacent a respective one of said chambers, said combination ring projecting radially outwardly of said piston whereby it maintains adjacent portions of the piston out of contact with said wall, a main seal ring carried by the piston between said combination rings and in sealing contact with said cylindrical inner wall, means for conducting fluid from each of said chambers past the respective combination ring to said main seal ring, an annular valve face at one end of the shell sealingly engageable with a transverse surface on one of said combination rings when said piston is moved to said one end of the shell to prevent flow of fluid between said chambers around said piston in the event said main seal ring fails to maintain sealing contact with said cylindrical inner wall.

2. The accumulator of claim 1 in which said conducting means for said one of said combination rings comprising openings through said one combination ring radially outwardly of said surface thereon for permitting said flow of fluid from the respective chamber past said one combination ring and up to one side of said main sealing ring when the valve face is not in engagement with said one combination ring.

3. An accumulator comprising a shell having a cylindrical inner wall, a piston axially movable in said shell and dividing the interior of the shell into two chambers, a combination guide and seal ring carried by the piston at each end thereof in slidable contact with said wall for guiding movement of said piston, each of said combination rings being adjacent a respective one of said chambers, said combination rings projecting radially outwardly of said piston whereby they maintain adjacent portions of the piston out of contact with said wall, an annular valve face at one end of the shell sealingly engageable with a surface on one of said combination rings when said piston is moved to said one end of the shell to prevent flow of fluid between said chambers around said piston, a main seal ring carried by the piston between said combination rings and in sealing contact with said cylindrical inner wall, means for conducting fluid from each of said chambers past the respective combination ring to said main seal ring, said piston having an annular groove in its outer periphery near one end of said piston to receive said one of said carbination, a first radial wall of said groove remote from said one piston end extending to a diameter closely adjacent said cylindrical inner wall, a flange on said piston providing a second radial wall of said groove that is adjacent said one piston end and which extends to a lesser diameter than said first radial wall, and said valve face being on an annular axially projecting portion of said shell that extends axially over said flange when said valve face engages said one of said combination rings.

4. The accumulator of claim 3 in which there is another annular groove in said piston at the other end thereof that receives the other of said combination rings and which is identical to said first mentioned annular groove.

* * * * *